United States Patent [19]

Liu et al.

[11] Patent Number: 6,041,390
[45] Date of Patent: Mar. 21, 2000

[54] TOKEN MECHANISM FOR CACHE-LINE REPLACEMENT WITHIN A CACHE MEMORY HAVING REDUNDANT CACHE LINES

[75] Inventors: Peichun Peter Liu; Rajinder Paul Singh; Shih-Hsiung Steve Tung, all of Austin, Tex.

[73] Assignee: International Business Machines Corporation, Armonk, N.Y.

[21] Appl. No.: 08/773,545

[22] Filed: Dec. 23, 1996

[51] Int. Cl.[7] ..................................................... G06F 12/12
[52] U.S. Cl. .......................... 711/110; 711/133; 711/134; 711/146
[58] Field of Search .................................. 711/110, 133, 711/134, 146, 132, 207, 144, 145

[56] References Cited

U.S. PATENT DOCUMENTS

| 5,043,870 | 8/1991 | Ditzel et al. | 711/132 |
| 5,155,825 | 10/1992 | Moughanni et al. | 711/207 |
| 5,410,697 | 4/1995 | Baird et al. | 711/152 |
| 5,553,254 | 9/1996 | Berstis et al. | 712/207 |
| 5,611,074 | 3/1997 | Kantz et al. | 711/146 |

*Primary Examiner*—B. James Peikari
*Attorney, Agent, or Firm*—Anthony V. S. England; Anthony P. Ng; Andrew J. Dillon

[57] ABSTRACT

A mechanism for cache-line replacement within a cache memory having redundant cache lines is disclosed. In accordance with a preferred embodiment of the present invention, the mechanism comprises a token, a multiple of token registers, multiple allocation-indicating circuits, multiple bypass circuits, and a circuit for replacing a cache line within the cache memory in response to a location of the token. Incidentally, the token is utilized to indicate a candidate cache line for cache-line replacement. The token registers are connected in a ring configuration, and each of the token registers is associated with a cache line of the cache memory, including all redundant cache lines. Normally, one of these token registers contains the token. Each token register has an allocation-indicating circuit. An allocation-indicating circuit is utilized to indicate whether or not an allocation procedure is in progress at the cache line with which the allocation-indicating circuit is associated. Each token register also has a bypass circuit. A bypass circuit is utilized to transfer the token from one token register to an adjacent token circuit in response to an indication from the associated allocation-indicating circuit.

14 Claims, 4 Drawing Sheets

TOKEN MECHANISM FOR CACHE-LINE REPLACEMENT WITHIN A CACHE MEMORY HAVING REDUNDANT CACHE LINES

BACKGROUND OF THE INVENTION

1. Technical Field

The present invention relates to a cache memory for data storage in general and, in particular, to a cache memory having redundant cache lines. Still more particularly, the present invention relates to a mechanism for cache-line replacement within a cache memory having redundant cache lines.

2. Description of the Prior Art

During manufacturing process, all integrated circuits (ICs) are tested for manufacturing defects. Any IC that is found to be defective will be discarded. In order to improve the yield of the manufacturing process, it is well-known in the industry to include redundant circuits within an IC. For example, multiple redundant rows and columns are often included in memory devices for replacing rows and columns that may be inoperative due to manufacturing defects. Further, a fuse link is commonly connected between the input pin and the internal circuitry of the IC. If a defective location is identified and the defect can be corrected by substituting a redundant circuit for an inoperative circuit within the IC, then the fuse link is disconnected, for example, by laser zapping, to enable a functional redundant circuit over the defective circuit. The manufacturing process is then completed and the IC is packaged to be sold to customers.

For modern microprocessors, on-chip random access memories (RAMs) are commonly employed in cache memory implementations. Moreover, redundant cache lines are also provided within these on-chip cache memories, and the aforementioned technique is utilized to select a redundant cache line when an "original" cache line is found to be defective. As an example, a cache memory having 128 cache lines may be implemented with two redundant cache lines such that the cache memory has an array of 130 cache lines in total. During manufacturing tests, cache line faults within the cache memory are analyzed. If there is no cache line fault found in the cache memory, none of the redundant cache lines will be enabled. However, if there is a cache line fault found, the faulty cache line will be disabled by a set of fuses and one of the two redundant cache lines will be enabled. Thus, the cache memory will exit the manufacturing process with 128 cache lines enabled and two cache lines disabled.

In general, it is useful to have a cache-line replacement scheme that can efficiently utilize the physical design of the cache memory. More importantly, such cache-line replacement scheme should be able to select a cache line that is not currently allocated, and such cache-line replacement scheme should ignore the nonselected redundant lines in an efficient manner. Consequently, it would be desirable to provide a mechanism for cache-line replacement that allocates vacant locations or pseudo-random locations in a cache memory having redundant cache lines.

SUMMARY OF THE INVENTION

In view of the foregoing, it is therefore an object of the present invention to provide an improved cache memory for data processing.

It is another object of the present invention to provide an improved cache memory having redundant cache lines.

It is yet another object of the present invention to provide an improved mechanism for cache-line replacement within a cache memory having redundant cache lines.

In accordance with a preferred embodiment of the present invention, the mechanism comprises a token, a multiple of token registers, multiple allocation-indicating circuits, multiple bypass circuits, and a circuit for replacing a cache line within a cache memory in response to a location of the token. Incidentally, the token is utilized to indicate a candidate cache line for cache-line replacement. The token registers are connected in a ring configuration, and each of the token registers is associated with a cache line of the cache memory, including all redundant cache lines. Normally, one of these token registers contains the token. Each token register has an allocation-indicating circuit. An allocation-indicating circuit is utilized to indicate whether or not an allocation procedure is in progress at the cache line with which the allocation-indicating circuit is associated. Each token register also has a bypass circuit. A bypass circuit is utilized to transfer the token from one token register to an adjacent token circuit in response to an indication from the associated allocation-indicating circuit.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be implemented in any data-processing system having a cache memory. Also, it is understood that the features of the present invention may be applicable in various data-processing systems having a primary cache and a secondary cache.

Figure 1:
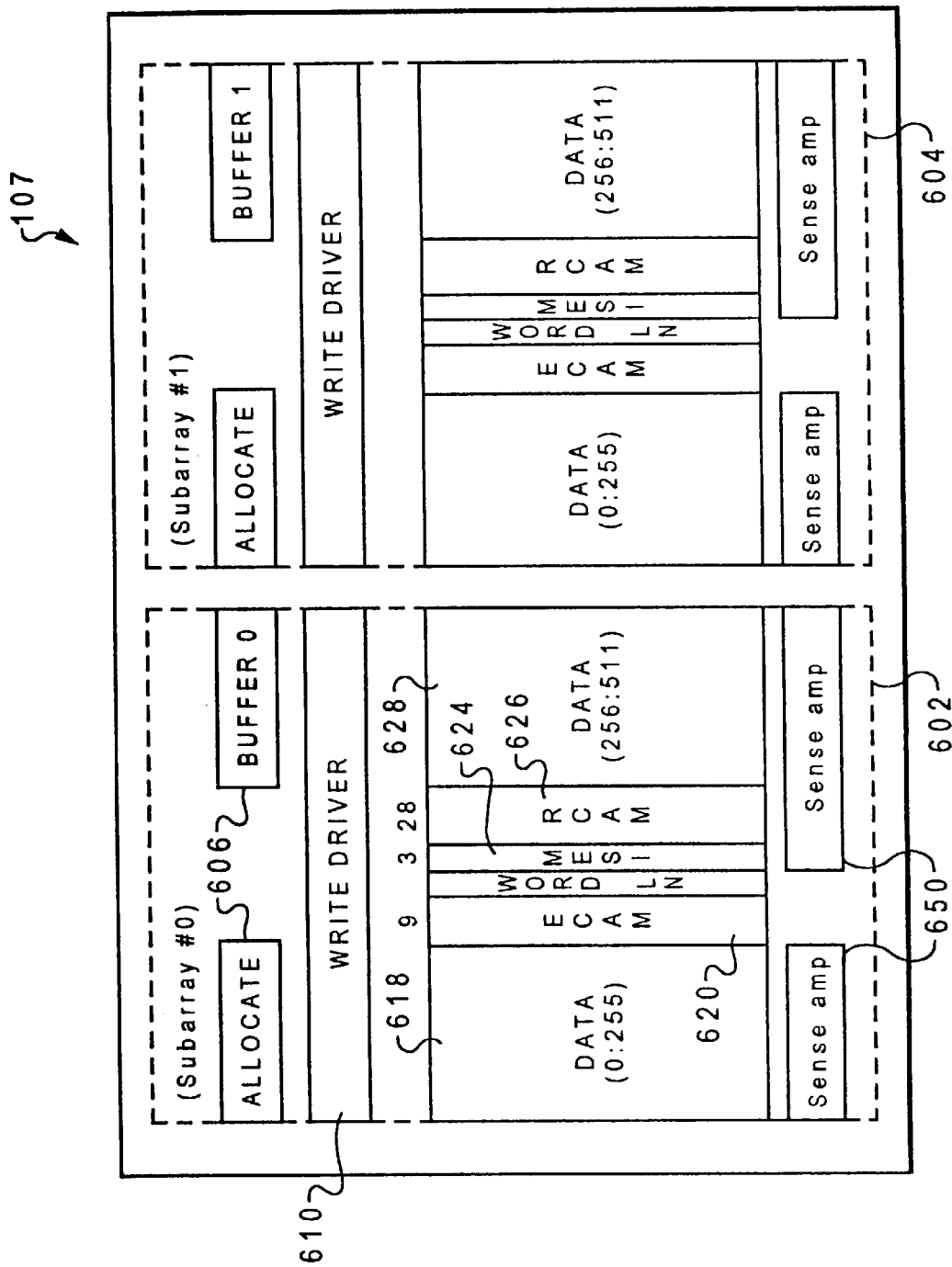
FIG. 1 is a block diagram of a cache memory in which a preferred embodiment of the present invention may be incorporated.

Referring now to the drawings and in particular to FIG. 1, there is illustrated a block diagram of a cache memory in which a preferred embodiment of the present invention can be incorporated. Cache memory 107 preferably includes two subarrays 602 and 604; however, as those skilled in the art will appreciate upon reference to the present specification, a larger number of subarrays may be provided. Because subarrays 602 and 604 are essentially identical, only subarray 602 will be described in further detail.

Subarray 602 preferably includes 128 cache lines and two redundant cache lines. Each cache line includes a 512-bit data field, which is broken into two segments, as depicted at 618 and 628 within subarray 602. Each cache line also preferably includes a 64-bit parity field (not shown), a 9-bit ECAM field 620, a 28-bit RCAM field 626, and a 3-bit MESI field 624. As those skilled in the art will appreciate the so-called "MESI" is an acronym which stands for "Modified," "Exclusive," "Shared," and "Invalid." The status of any cache line may be efficiently determined by interrogating the status of the bits within MESI field 624. Also, the status of any cache line may be altered by writing different bits into MESI field 624.

Additionally, subarray 602 includes an associated allocate buffer 606 and an associated write driver 610 that are utilized to drive data into a particular cache line. Similarly, sense amplifier 650 is provided for amplifying an output signal from a particular cache line.

Figure 2:
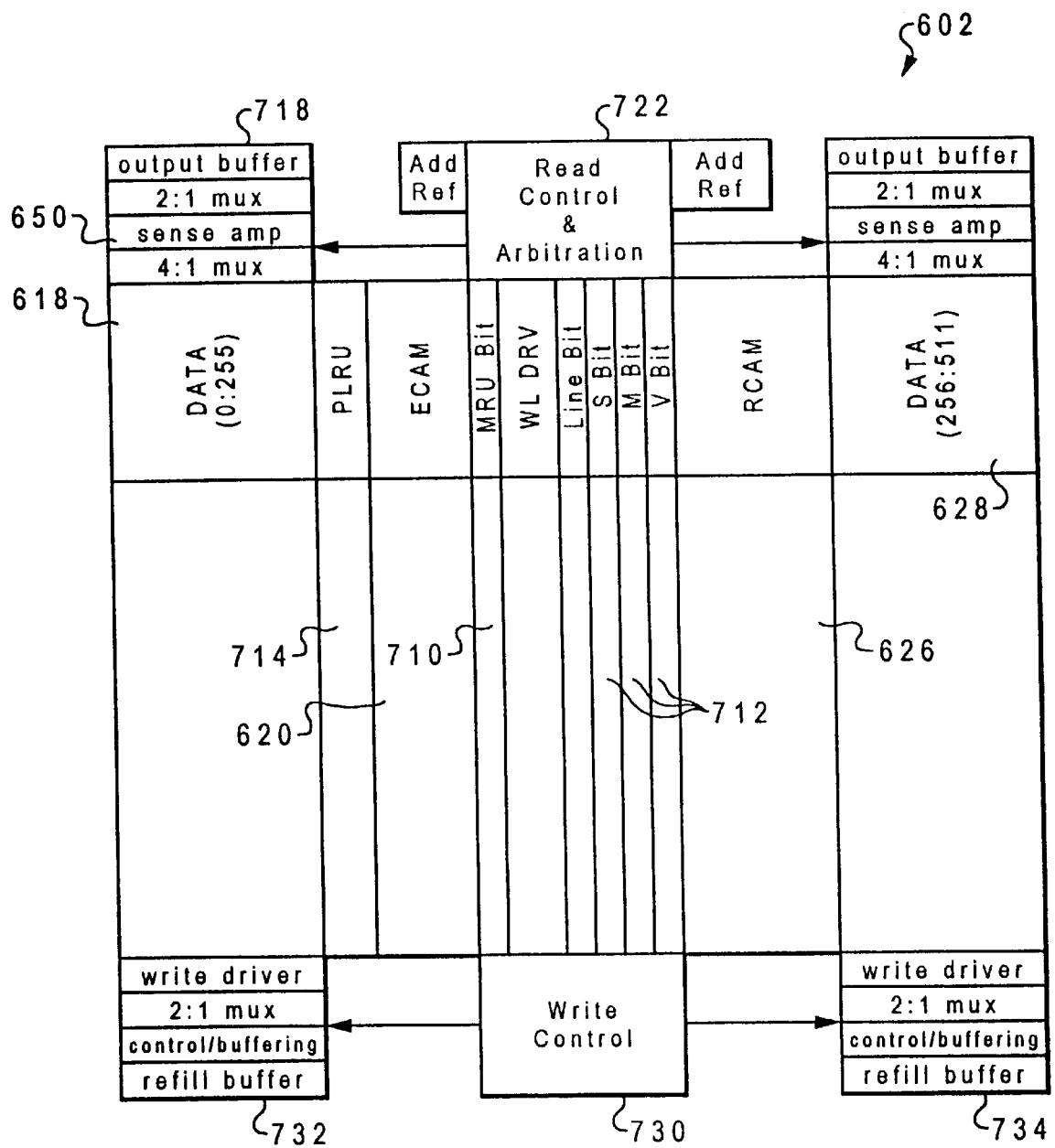
FIG. 2 is a detailed illustration of a subarray within the cache memory of FIG. 1.

With reference now to FIG. 2, there is depicted a detailed illustration of subarray 602 within the cache memory of FIG. 1. As shown, each cache line within subarray 602 includes 512 bits of data which are divided into data fields 618 and 628. RCAM field 626 is preferably a 33-bit real-address content-addressable field, and ECAM field 620 is preferably a 13-bit effective-address content-addressable field. By providing two separate and distinct content-addressable fields—ECAM field 620 and RCAM field 626—within each cache line, data within that cache line may be accessed in a number of efficient sequences. In addition, a most recently utilized (MRU) bit field 710 is utilized in conjunction with ECAM field 620 to resolve offset and aliasing situations. Also, the bits within MESI field 624 are illustrated in greater detail at reference numeral 712.

As mentioned previously, subarray 602 includes 128 cache lines and two redundant cache lines. A pseudo least recently utilized (PLRU) logic circuit 714 is present within subarray 602 for allocating one of the 128 active cache lines within subarray 602 for removal and replacement in the event of a cache "miss."

Read Control & Arbitration Circuit 722, output buffers 718, and sense amplifiers 650 are utilized in a conventional manner to read data from a cache line. Finally, write control 730 is utilized in conjunction with write drivers and the associated multiplexers, as indicated at 732 and 734, to permit data within subarray 602 to be written.

Figure 3:
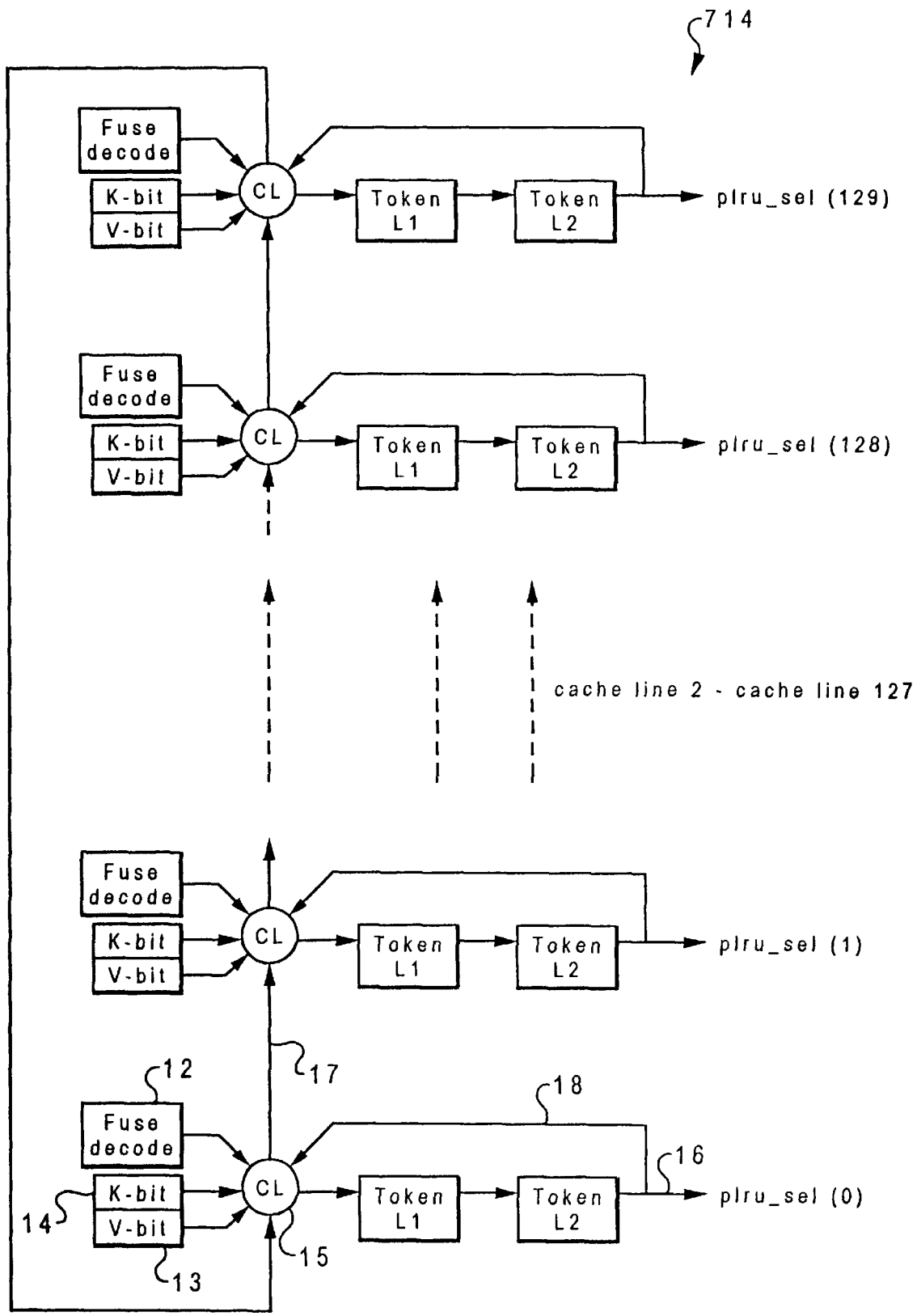
FIG. 3 is a block diagram of a PLRU implementation for cache-line replacement in accordance with a preferred embodiment of the present invention.

Referring now to FIG. 3, there is illustrated a block diagram of a PLRU implementation for cache-line replacement in accordance with a preferred embodiment of the present invention. As shown, PLRU 714 is implemented in the manner of a token ring. Each of the 130 cache lines within PLRU 714 has two token registers, L1 and L2. These token registers are preferably implemented by flip-flops with token register L1 being the master and token register L2 being the slave. Token register L1 is preferably clocked by a first clock, $C_1$, while token register L2 is preferably clocked by a second clock, $C_2$. Conceptually, the master-slave arrangement of token registers L1 and L2 may be viewed as a single token register. Token registers for cache line 1 to cache line 129 within PLRU 714 are initialized to a "0" at power-on reset time, while token register for cache line 0 is initialized to a "1." This assures that there is only one token within the token ring of cache lines at initialization time.

Also associated with each cache line is a fuse decode signal 12, a V-bit signal 13, and a K-bit signal 14. Fuse decode signal 12, V-bit signal 13, and K-bit signal 14 are coupled together via a combination logic 15. Fuse decode signal 12 indicates whether or not an associated redundant cache line is enabled because a corresponding cache line is defective. For an arrangement of 128 cache lines plus two redundant cache lines, an 8-bit fuse is preferably utilized for such decoding. V-bit signal 13 indicates whether or not the associated cache line is valid. V-bit signal 13 comes from the MESI field mentioned above. K-bit signal 14 indicates whether or not the associated cache line is currently being allocated. The K-bit of a cache line is set to a "1" during an allocation cycle and is reset to a "0" during a refill cycle. Based on the information from fuse decode signal 12, V-bit signal 13, and K-bit signal 14, combination logic 15 determines whether or not the token within the token ring of PLRU 714 should reside in a particular cache line. If a cache line is not allocated according to K-bit signal 14 while a V-bit stored in a V-bit memory cell is "0," then the token will loop back to token registers L1, L2 via path 18. Output 16, also from the output of token registers L1, L2, may be utilized to drive a global wordline of the cache memory for the purpose of line allocation. On the contrary, if a cache line is allocated according to K-bit signal 14, the token will be passed to the next sequential position (an adjacent cache line) within the token ring via path 17. Thus, the token moves around the token ring until it is latched onto a non-allocated, non-defective cache line (or a non-allocated, enabled redundant cache line). As a preferred embodiment of the invention, the cache line in which the token resides is the candidate to be utilized for cache-line replacement after a cache "miss." Further, under the cache-line replacement scheme as disclosed, a cache line having an invalid status should always be chosen first as the candidate for cache-line replacement.

Under the present invention, all 128 cache lines appear to be identical (or symmetrical) as to the token. Hence, although only one cache line is described, one skilled in the art will appreciate the same arrangement is also applicable to the remaining cache lines shown in FIG. 3.

During the power-on reset period for the cache memory, a token is initialized to point to the first cache line (cache line 0). After power-on reset, the token movement is mainly controlled by the processor clock or clocks. As a preferred embodiment of the present invention, the token moves in response to each clock cycle of the processor. During token movement, the token typically moves from a token register to a token register of an adjacent cache line. However, the token may skip over several consecutive token registers by following certain token register skipping rules, as follows:

1. The token will not move to another token register if V-bit="0" and K-bit="0" occur in the token register in which the token resides. Thus, the token will stay in a token register of a cache line until the K-bit changes from a "0" to a "1."
2. When moving, the token will skip over a token register if K-bit of the token register is set to a "1," or if the cache line is marked as defective by a fuse decode signal, or if the cache line is a redundant cache line that is not enabled (not configured for defective cache-line replacement).

Figure 4:
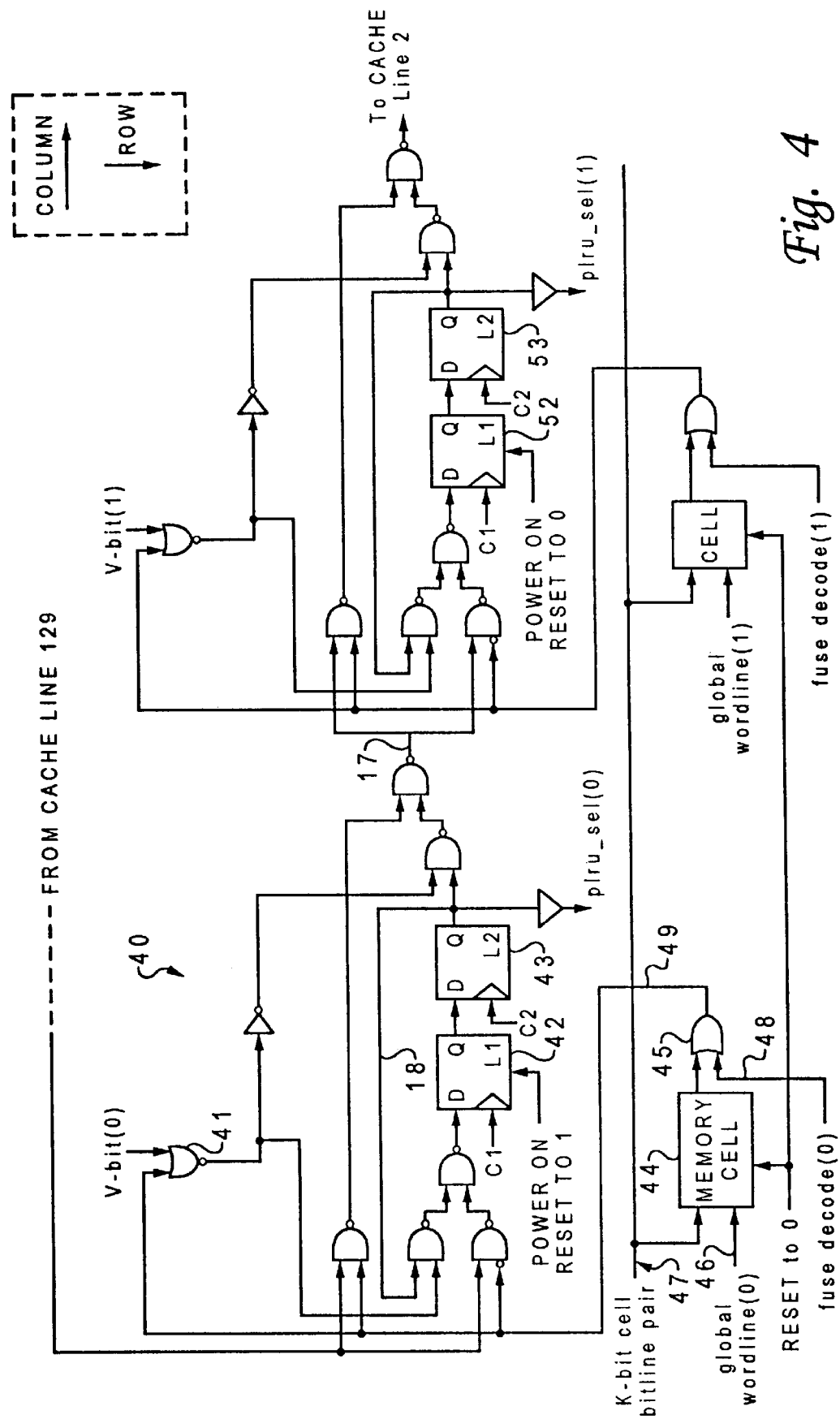
FIG. 4 is a detailed illustration of the PLRU implementation for cache-line replacement, according to a preferred embodiment of the present invention.

With reference now to FIG. 4, there is depicted a detailed illustration of the PLRU implementation for cache-line replacement, according to a preferred embodiment of the present invention. In FIG. 4, only token registers for cache line 0 and cache line 1, are shown. As a preferred embodiment of the invention, token register for cache line 0 supports power-on reset to a "1, " while token register for cache line 1 supports power-on reset to a "0. " Those who are skilled in the art will appreciate that all subsequent token registers within the token ring are identical to the token register for cache line 1.

As shown, the V-bit signal is input to token circuit 40 via a two-input NOR gate 41. The fuse decode signal is input to token circuit 40 via a two-input OR gate 45. The K-bit signal, for indicating line allocation, is stored in a K-bit memory cell 44. K-bit memory cell 44 is preferably a standard six-transistor SRAM cell having a reset feature. K-bit memory cell 44 is indexed by a global wordline 46 and a K-bit cell bitline pair 47. As a preferred embodiment of the invention, K-bit cell bitline pair 47 are only driven by a second clock, $C_2$.

When asserted, K-bit memory cell 44 causes the token to bypass the associated token register. K-bit memory cell 44 is asserted during a line allocation cycle. K-bit memory cell 44 is preferably set to a "1" before a line-allocation cycle when the associated cache line is being allocated (both K-bit cell bitline pair and a wordline indicate a particular cache line is being allocated). In addition, an asserted fuse decode signal 48 (when an associated fuse is blown during manufacturing for cache lines that were chosen to be redundant) indicates the associated cache lines are redundant, and the token will also bypass these cache lines. Thus, an asserted signal from an output 49 of OR gate 45 can be looked upon as a bypass signal for relocating the token to an adjacent token registers.

Token registers for cache line 0 are implemented by flip-flop 42 as the master and flip-flop 43 as the slave. Flip-flop 42 is preferably clocked by a first clock, $C_1$, while flip-flop 43 is preferably clocked by a second clock, $C_2$. If K-bit memory cell 44 is not asserted, the token will remain in token registers 42, 43 by following path 18. However, if K-bit memory cell 44 is asserted for a line-allocation cycle, the token will move to token registers 52, 53 of cache line 1 via path 17. As mentioned previously, in addition to K-bit memory cell 44, the other factor that can cause the token to move is fuse decode signal 48.

As has been described, the present invention provides an improved mechanism for cache-line replacement within a cache memory having redundant cache lines. This mechanism selects a candidate cache line for cache-line replacement according to the location of a token.

While the invention has been particularly shown and described with reference to a preferred embodiment, it will be understood by those skilled in the art that various changes in form and detail may be made therein without departing from the spirit and scope of the invention.

What is claimed is:

1. A cache memory, comprising:
    a plurality of cache lines;
    a plurality of token registers connected in a loop configuration, wherein each of said plurality of token registers is associated with a respective one of said plurality of cache lines;
    a plurality of K-bit memory cells, wherein each of said plurality of K-bit memory cells is associated with a respective one of said plurality of cache lines;
    a plurality of V-bit memory cells, wherein each of said plurality of V-bit memory cells is associated with a respective one of said plurality of cache lines; and
    a token for indicating a candidate cache line for cache-line replacement, wherein said token resides within one of said plurality of token registers having its associated V-bit memory cell set to a first state, wherein said token moves to another one of said plurality of token registers when said associated V-bit memory cell changes to a second state, wherein said token skips a token register associated with a cache line when its associated K-bit memory cell is in a first state.

2. The cache memory according to claim 1, wherein said first state for said V-bit memory cell is a logical "0."

3. The cache memory according to claim 1, wherein said first state for said K-bit memory cell is a logical "1."

4. The cache memory according to claim 1, wherein said cache memory further includes an allocation-indicating circuit for indicating a line allocation procedure is in progress in a cache line such that said token will not reside in a token ring associated with said cache line.

5. The cache memory according to claim 1, wherein said cache memory further includes a plurality of fuse decoders, wherein each of said plurality of fuse decoders is associated with a respective one of said plurality of cache lines.

6. The cache memory according to claim 5, wherein said token will not reside in a token register of a cache line when a fuse decoder associated with said cache line is set.

7. The cache memory according to claim 1, wherein said cache memory further includes a means for replacing a cache line within said cache memory in response to a location of said token.

8. A data-processing system, comprising:
    a cache memory, wherein said cache memory includes a plurality of cache lines;
    a plurality of token registers connected in a loop configuration, wherein each of said plurality of token registers is associated with a respective one of said plurality of cache lines;
    a plurality of K-bit memory cells, wherein each of said plurality of K-bit memory cells is associated with a respective one of said plurality of cache lines;
    a plurality of V-bit memory cells, wherein each of said plurality of V-bit memory cells is associated with a respective one of said plurality of cache lines; and
    a token for indicating a candidate cache line for cache-line replacement, wherein said token resides within one of said plurality of token registers having its associated V-bit memory cell set to a first state, wherein said token moves to another one of said plurality of token registers when said associated V-bit memory cell changes to a second state, wherein said token skips a token register associated with a cache line when its associated K-bit memory cell is in a first state.

9. The data-processing system according to claim 8, wherein said first state for said V-bit memory cell is a logical "0."

10. The data-processing system according to claim 8, wherein said first state for said K-bit memory cell is a logical "1."

11. The data-processing system according to claim 8, wherein said cache memory further includes an allocation-indicating circuit for indicating a line allocation procedure is in progress in a cache line such that said token will not reside in a token register associated with said cache line.

12. The data-processing system according to claim 8, wherein said cache memory further includes a plurality of fuse decoders, wherein each of said plurality of fuse decoders is associated with a respective one of said plurality of cache lines.

13. The data-processing system according to claim 8, wherein said token will not reside in token register of a cache line when a fuse decoder associated with said cache line is set.

14. The data-processing system according to claim 8, wherein said cache memory further includes a means for replacing a cache line within said cache memory in response to a location of said token.

* * * * *